(12) United States Patent
He et al.

(10) Patent No.: US 11,881,815 B2
(45) Date of Patent: Jan. 23, 2024

(54) PHOTOVOLTAIC INVERTER SYSTEM, AUTOMATIC LOCATING METHOD OF RAPID SHUTDOWN DEVICES AND FAULT CONTROL METHOD THEREOF

(71) Applicant: Delta Electronics (Shanghai) Co., Ltd., Shanghai (CN)

(72) Inventors: Chengjun He, Shanghai (CN); Feidong Xu, Shanghai (CN); Xuancai Zhu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/660,418

(22) Filed: Apr. 25, 2022

(65) Prior Publication Data

US 2022/0368282 A1 Nov. 17, 2022

(30) Foreign Application Priority Data

May 13, 2021 (CN) .......................... 202110522332.6

(51) Int. Cl.
*H02S 50/10* (2014.01)
*H02S 40/32* (2014.01)
*H02S 20/32* (2014.01)

(52) U.S. Cl.
CPC .............. *H02S 50/10* (2014.12); *H02S 20/32* (2014.12); *H02S 40/32* (2014.12)

(58) Field of Classification Search
CPC ........... H02S 20/32; H02S 40/32; H02S 50/10
See application file for complete search history.

(56) References Cited

U.S. PATENT DOCUMENTS

| 2016/0118934 | A1 | 4/2016 | Johnson et al. | |
| 2016/0329715 | A1 | 11/2016 | Orr et al. | |
| 2017/0288408 | A1* | 10/2017 | Kim | H02J 3/388 |
| 2019/0363200 | A1* | 11/2019 | Höft | H02S 40/36 |
| 2020/0303949 | A1* | 9/2020 | Pauletti | H02J 3/381 |

FOREIGN PATENT DOCUMENTS

| CN | 104950199 B | 2/2018 |
| CN | 111181488 A | 5/2020 |
| CN | 111585307 A | 8/2020 |

* cited by examiner

*Primary Examiner* — Son T Le
*Assistant Examiner* — Adam S Clarke
(74) *Attorney, Agent, or Firm* — CKC & Partners Co., LLC

(57) ABSTRACT

The application provides a photovoltaic inverter system, an automatic locating method of RSDs and a fault control method thereof. The automatic locating method comprises turning off all RSDs and sampling a voltage of an output end of each RSD as a first voltage before an inverter operates; turning on any one of the RSDs and sampling a voltage of the output end of each RSD as a second voltage, determining all RSDs in a photovoltaic module string to which the RSD in a turned-on state belongs according to the first voltage and the second voltage, and repeating the above control method for any one of the RSDs outside the photovoltaic module string to which the determined RSDs belong until corresponding connection relations between all RSDs and all photovoltaic module strings are determined.

13 Claims, 9 Drawing Sheets

Identifying an installing position of each RSD in the photovoltaic inverter system using the automatic locating method as described above, wherein the installing position comprises corresponding connection relations between the RSDs and the photovoltaic module strings, and corresponding connection relations between the photovoltaic module strings, and the inverter and the input ends of the inverter.

When any one of the RSDs has a fault, turning off other RSDs in a same photovoltaic module string to which the RSD having the fault belongs to place these RSDs in a standby state, and placing all of the RSDs outside of the photovoltaic module string to which the RSD having the fault belongs in a normal operating state.

FIG. 10

PHOTOVOLTAIC INVERTER SYSTEM, AUTOMATIC LOCATING METHOD OF RAPID SHUTDOWN DEVICES AND FAULT CONTROL METHOD THEREOF

CROSS-REFERENCE TO RELATED APPLICATIONS

This non-provisional application claims priority under 35 U.S.C. § 119(a) on Patent Application No. 202110522332.6 filed in P.R. China on May 13, 2021, the entire contents of which are hereby incorporated by reference.

BACKGROUND OF THE INVENTION

1. Field of the Invention

The application relates to photovoltaic power generation technology field, and particularly relates to a photovoltaic inverter system, an automatic locating method of a rapid shutdown device (RSD) and a fault control method thereof.

2. Related Art

With the rapid development of photovoltaic power generation technology, it has been applied in a wide range. The traditional photovoltaic power generation system comprises photovoltaic modules, junction boxes and inverters. The photovoltaic modules in the photovoltaic power generation system can convert the solar energy into DC electric energy, and the inverters convert the DC electric energy into AC electric energy and then transmit the AC electric energy to a power grid or directly to user. The photovoltaic modules connected in series, in parallel or in series and parallel have an extremely high voltage and energy. In a case of installing, debugging or maintenance of the system, or emergency such as earthquake or fire, an operator may contact the photovoltaic modules or wires with dangerous voltage to be electrically shocked. Therefore, the photovoltaic power generation system should be combined with a rapid shutdown system to rapidly block the dangerous voltage in an operating region of the operator in the above case, thereby reducing or eliminating the risk of electric shock for the operator.

The rapid shutdown system may comprise rapid shutdown device (RSD) and a controller. The RSD is generally installed on a back side of the photovoltaic modules in the photovoltaic inverter system. The RSD has an input end connected to an output end of one photovoltaic module and has an output end connected in series to output ends of other individual photovoltaic modules and other RSD to constitute a photovoltaic module string. The controller is generally installed in the inverter of the photovoltaic inverter system, and is configured to communicate with the RSDs of the photovoltaic module string connected to input ends of the inverters, and control operating states of the inverter and the RSDs according to relevant data of the inverter and the RSDs. In normal cases, the RSDs of the photovoltaic inverter system are turned on, and when a fault occurs, the RSDs are turned off to shut down the circuit.

However, since the photovoltaic inverter system cannot automatically identify the installing positions of the RSDs, although each RSD is controlled by the controller, the controller cannot control the RSD in the specific photovoltaic module string, and can only provide a same control instruction to all RSDs, which greatly reduces flexibility and controllability of the photovoltaic inverter system.

Therefore, locating the RSDs in the photovoltaic inverter system is significantly important. In the prior art, there are two methods for locating the RSDs. One method is a manual labeling method comprising designating an installing position of each RSD when the system is installed, recording the installing positions by operator, and inputting the installing positions into the controller of the inverter. This is a method with low efficiency and low fault-tolerant rate. Another method is a current or power locating method which mainly uses a characteristic that the current is identical in the same photovoltaic module string to determine the RSDs in a same photovoltaic module string. The current or power locating method comprises turning off or bypassing one RSD using the controller, and identifying the installing position of the RSD according to a change of current or power. However, since the RSD does not have a current sensor, such method increases the cost for manufacturing the photovoltaic inverter system.

SUMMARY OF THE INVENTION

With respect to the problems in the prior art, an object of the application is to provide a photovoltaic inverter system, an automatic locating method of rapid shutdown device (RSD) and a fault control method thereof, which can effectively solve one or more deficiencies of the prior art.

To realize the above objects, according to one embodiment of the application, the application provides an method for automatically locating rapid shutdown devices (RSDs) of a photovoltaic inverter system, comprising: step S1 for providing a plurality of photovoltaic module strings, each comprising at least one photovoltaic module and at least one RSD, input end of the RSD electrically connected to output end of the photovoltaic module, output ends of all RSDs in a same photovoltaic module string connected in series when a number of the RSDs in the same photovoltaic module string is greater than 1; step S2 for providing at least one inverter, the photovoltaic module string electrically connected to an input end of the inverter; step S3 for turning off all RSDs and sampling a voltage of the output end of each RSD as a first voltage before the inverter operates; step S4 for turning on any one of the RSDs of the photovoltaic inverter system and sampling a voltage of the output end of each RSD as a second voltage, and determining all RSDs in the photovoltaic module string to which the RSD in turned-on state belongs according to the first voltage and the second voltage of the output end of each RSD; and step S5 for repeating steps S3 and S4 for any one of the RSDs outside the photovoltaic module string to which the determined RSDs belong until corresponding connection relations between all RSDs and all photovoltaic module strings are determined.

In one embodiment of the application, after the corresponding connection relations between all RSDs and all photovoltaic module strings are determined, the method further comprises: step S6 for turning off all RSDs and sampling a voltage of each input end of each inverter as a third voltage; step S7 for turning on all RSDs in any one of the photovoltaic module strings of the photovoltaic inverter system, sampling a voltage of each input end of each inverter as a fourth voltage, and determining the inverter and the relation between the input end of the inverter and the photovoltaic module string having all RSDs in the turned-on state according to the third voltage and the fourth voltage of each input end of each inverter; and step S8 for repeating steps S6 and S7 for any one of the photovoltaic module strings except the photovoltaic module string connected to the determined inverter and the determined input end of the inverter until corresponding connection relations of all photovoltaic module strings with the inverter and the input end of the inverter are determined.

To realize the above objects, the application further provides a photovoltaic inverter system configured to implement the above method for automatically locating rapid shutdown devices (RSDs) in the photovoltaic inverter system.

To realize the above objects, the application further provides a fault control method for a photovoltaic inverter system, comprising: identifying an installing position of each RSD in the photovoltaic inverter system using the above method, wherein the installing position comprises corresponding connection relations between the RSDs and the photovoltaic module strings, and corresponding connection relations between the photovoltaic module strings, and the inverter and the input ends of the inverter; and when any one of the RSDs has a fault, turning off other RSDs in a same photovoltaic module string to which the RSD having the fault belongs to place these RSDs in a standby state, and placing all of the RSDs outside of the photovoltaic module string to which the RSD having the fault belongs in a normal operating state.

The application can automatically identify the installing position of the RSDs in the photovoltaic inverter system without additional current sensor, so the cost is not increased, and the accuracy and efficiency are improved.

The application can control all the RSDs in any one of the photovoltaic module strings by identifying the installing position of the RSDs, so the controllability is improved.

When the RSD in one photovoltaic module string has a fault, the fault control method of the application will turn off other RSDs in a same photovoltaic module string to which the RSD having the fault belongs, and may not influence the power generation operation of the photovoltaic modules in other photovoltaic module strings, so the robustness and the economic effectiveness of the system are enhanced.

The additional aspects and advantages of the application are partially explained in the below description, and partially become apparent from the description, or can be obtained through the practice of the application.

BRIEF DESCRIPTION OF THE DRAWINGS

The exemplary embodiments are described in details with reference to the accompanying drawings, through which the above and other features and advantages of the application will become more apparent.

FIG. 10 is a schematic diagram of a fault control method for a photovoltaic inverter system according to the application.

DETAILED EMBODIMENTS OF THE INVENTION

Figure 1:
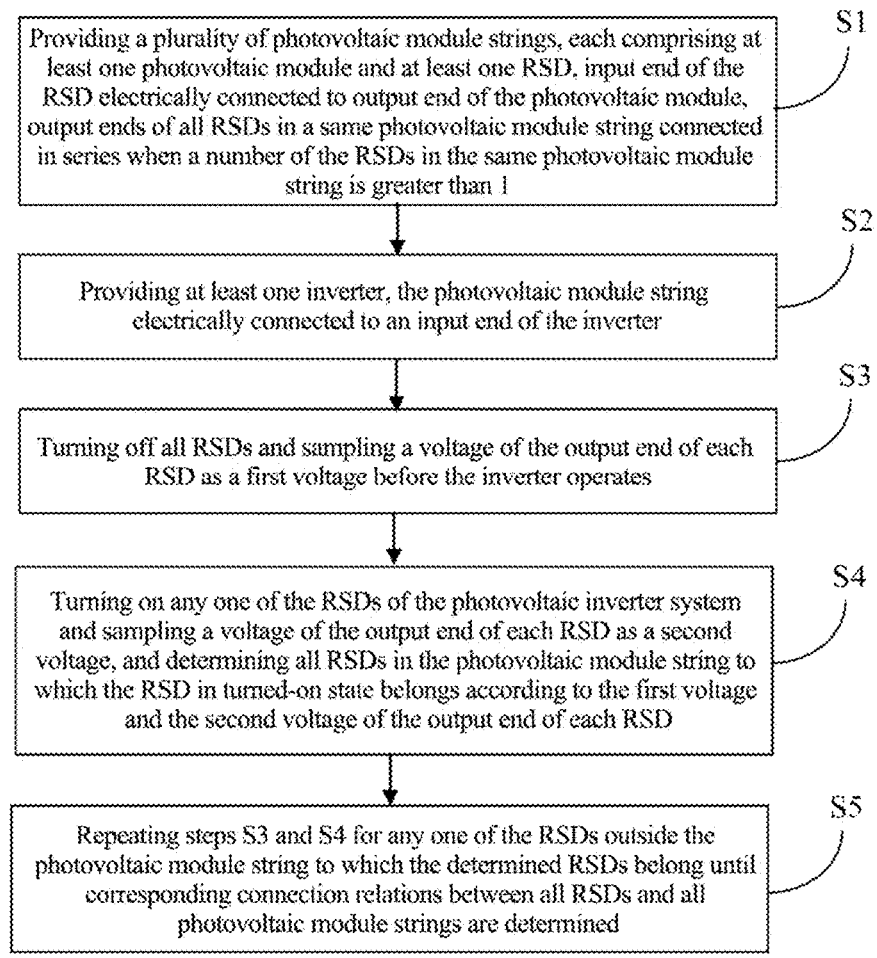
FIG. 1 is a schematic diagram of an automatic locating method of RSD of a photovoltaic inverter system according to the application.

The exemplary embodiments will now be described more fully with reference to the accompanying drawings. However, the exemplary embodiments can be implemented in various forms and shall not be understood as being limited to the embodiments set forth herein. On the contrary, these embodiments are provided so that this application will be thorough and complete, and the conception of exemplary embodiments will be fully conveyed to those skilled in the art. In the drawings, the same reference sign denotes the same or similar structure, so their detailed description will be omitted.

When elements/components described and/or illustrated here are introduced, the phrases "a", "an", "the", "said" and "at least one" refer to one or more elements/components. The terms "include", "comprise" and "have" refer to an open meaning, and additional elements/components in addition to the listed elements/components can be included. The embodiments may use a relative term, such as, "upper" or "lower" to describe a relative relation of one component over another component. It shall be understood that if the device reverses to turn upside down, a component described at an "upper" side will become a component at a "lower" side. In addition, the terms "first", "second" and the like in the claims are not numeral limitations to objects.

FIG. 1 illustrates a flow diagram of an automatic locating method of rapid shutdown devices (RSDs) of a photovoltaic inverter system according to an embodiment of the application. The automatic locating method comprises: step S1 for providing a plurality of photovoltaic module strings, each comprising at least one photovoltaic module and at least one RSD, the input ends of the RSDs electrically connected to the output ends of the photovoltaic modules, the output ends of all RSDs in a same photovoltaic module string connected in series when a number of the RSDs in the same photovoltaic module string is greater than 1; step S2 for providing at least one inverter, the photovoltaic module string electrically connected to an input end of the inverter; step S3 for turning off all RSDs and sampling a voltage of the output end of each RSD as a first voltage before the inverter operates; step S4 for turning on any one of the RSDs of the photovoltaic inverter system and sampling a voltage of the output end of each RSD as a second voltage, and determining all RSDs in the photovoltaic module string to which the RSD in turned-on state belongs according to the first voltage and the second voltage of the output end of each RSD; and step S5 for repeating steps S3 and S4 for any one of the RSDs outside the photovoltaic module string to which the determined RSDs belong until corresponding connection relations between all RSDs and all photovoltaic module strings are determined.

Through the steps S1 to S5, automatic location of all RSDs of the photovoltaic inverter system can be realized. That is, through the steps S1 to S5, it can be determined the photovoltaic module strings to which each RSD belongs.

Figure 2:
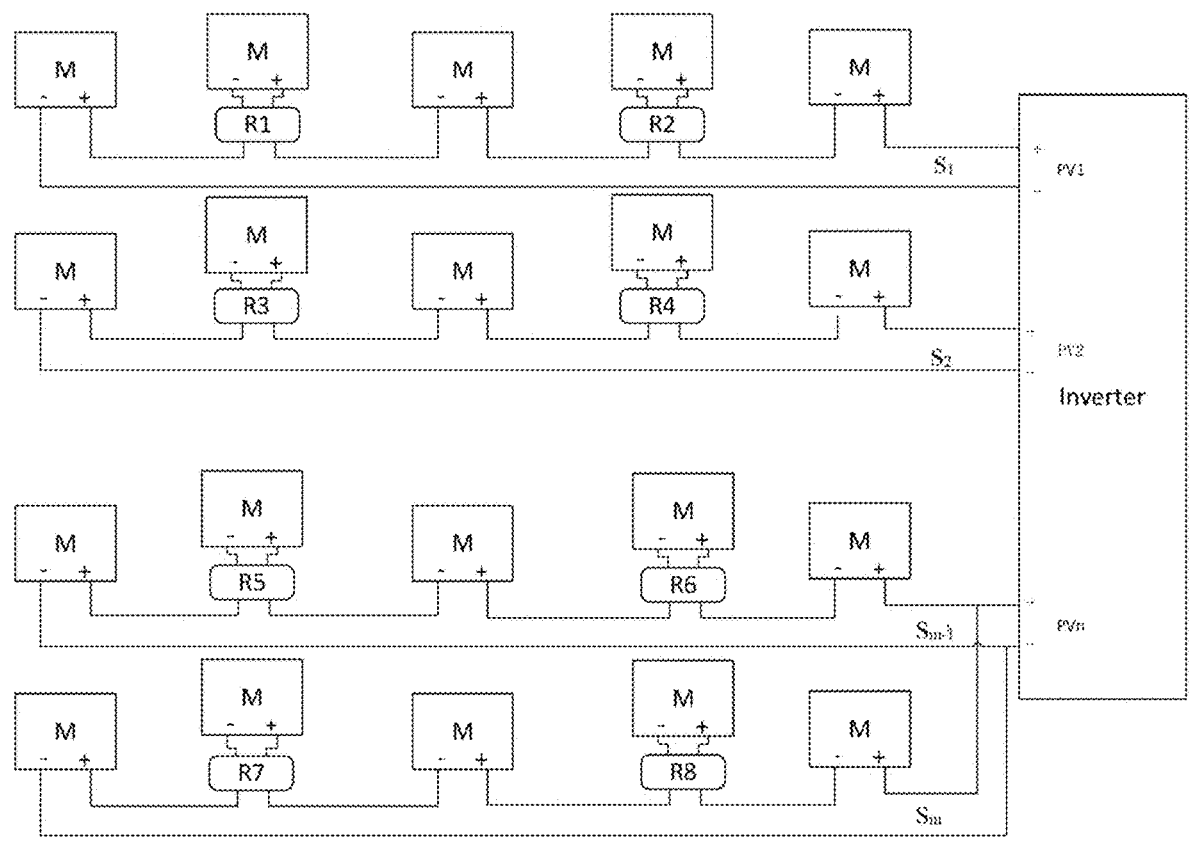
FIG. 2 shows a structure diagram of a photovoltaic inverter system according to the application.
Figure 9:
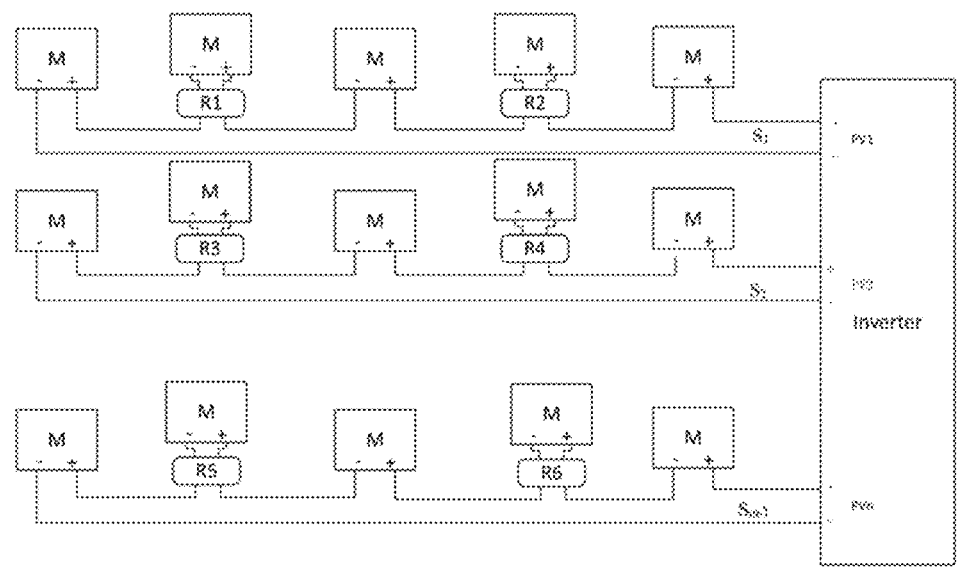
FIG. 9 shows a structure diagram of another photovoltaic inverter system according to the application.

FIG. 2 illustrates a structure diagram of a photovoltaic inverter system according to an embodiment of the application. The photovoltaic inverter system comprises a plurality of photovoltaic module strings and at least one inverter. Each photovoltaic module string comprises at least one photovoltaic module M and at least one rapid shutdown device (RSD), the input ends of the RSDs are electrically connected to the output end of the photovoltaic module, the output ends of all RSDs in a same photovoltaic module string are connected in series, and the photovoltaic module string is electrically connected an input end of an inverter. As shown in FIG. 2, the photovoltaic inverter system comprises m photovoltaic module strings $S_1$ to $S_m$ and one inverter, and each of the photovoltaic module strings $S_1$ to $S_m$ can comprise, but not limited to, five photovoltaic modules and two RSDs. For example, the photovoltaic module string $S_1$ comprises R1 R2 and photovoltaic modules, an input end of R1 is connected to an output end of one photovoltaic module, an input end of R2 is connected to an output end of another photovoltaic module, and three output ends of other three photovoltaic module except the above two photovoltaic modules in the photovoltaic module string $S_1$ are connected in series with output ends of R1 and R2. As shown in the FIG. 2, the inverter has n input ends PV1 to PVn, and the photovoltaic module strings are electrically connected to the input ends PV1 to PVn of the inverter. For example, the input end PV1 of the inverter is electrically connected to the photovoltaic module string $S_1$, the input end PV2 of the inverter is electrically connected to the photovoltaic module string $S_2$, and the input end PVn of the inverter is electrically connected to the photovoltaic module strings $S_{m-1}$ and $S_m$ connected in parallel. However, it can be understood that in other embodiment, the photovoltaic inverter system of the application may comprise a plurality of inverters, and the number of photovoltaic modules and the number of RSDs in each photovoltaic module string may be varied, but the application is not limited thereto. In other embodiment, N photovoltaic module strings may be connected in parallel to the same input end of one inverter, where N is an integer greater than 1. In other embodiment, as shown in FIG. 9, each of the photovoltaic module strings is respectively connected to one input end of the inverter.

In one embodiment of the application, the photovoltaic inverter system can further comprise one or more photovoltaic module strings only composed of the photovoltaic modules. The photovoltaic module string may be composed of one photovoltaic module or a plurality of photovoltaic modules connected in series. The photovoltaic module string can be directly connected to the input end of the inverter, or the photovoltaic module string and a plurality of photovoltaic module strings connected in parallel can be connected to the same input end of the inverter.

In one embodiment of the application, each inverter, for example, may comprise a controller, which can communicate with the inverter and the RSDs in the photovoltaic module string connected to the input ends of the inverter for controlling operating states of the inverter and the RSDs. In one embodiment of the application, the input ends PV1 to PVn of the inverter, for example, may be input ends having a function of maximum power point tracking (MPPT).

In one embodiment of the application, the number of photovoltaic modules may be greater than or equal to the number of RSDs in the same photovoltaic module string. When the number of photovoltaic modules is equal to the number of RSDs, the input end of each RSD is respectively connected to the output end of one photovoltaic module, and the output ends of all RSDs are connected in series. When the number of photovoltaic modules is greater than the number of RSDs, the input end of each RSD is respectively connected to the output end of one photovoltaic module, and the output ends of the photovoltaic modules not connected to the input ends of the RSDs are connected in series with the output ends of all RSDs.

Figure 3:
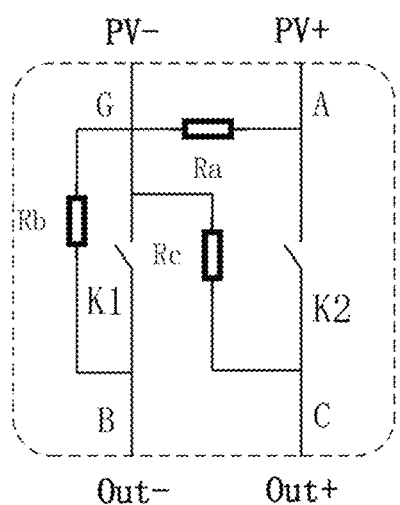
FIG. 3 shows a structure diagram of an internal voltage sampling circuit of the RSD according to the application.

In one embodiment of the application, each RSD may comprise a plurality of resistors and a plurality of switches. FIG. 3 illustrates an internal voltage sampling circuit of the RSD in the application. As shown in FIG. 3, one RSD comprises three sampling resistors Ra, Rb and Rc and two switches K1 and K2. In other embodiments, Ra, Rb or Rc can be an equivalent resistor of a plurality of resistors, but the application is not limited thereto. The three sampling resistors Ra, Rb and Rc may be configured to sample a voltage of an output end PV+ (relative to output end PV−) of the photovoltaic module, a voltage of an output end Out− (relative to output end PV−) of the RSD, and a voltage of an output end Out+ (relative to output end PV−) of the RSD, respectively. As shown in FIG. 3, a node G is connected to the output end PV−, a node A is connected to the output end PV+, a node B is connected to the output end Out−, and a node C is connected to the output end Out+. As shown in FIG. 3, Ra is electrically connected between the nodes G and A, Rb is electrically connected between the nodes G and B, Rc is electrically connected between the nodes G and C, K1 and Rb are connected in parallel, and K2 is electrically connected between the nodes A and C. The nodes A, B and C are nodes of sampling the voltages. The voltage sampled at the node A is an absolute value of a relative voltage between the node A and the node G, the voltage sampled at the node B is an absolute value of a relative voltage between the node B and the node G, and the voltage sampled at the node C is an absolute value of a relative voltage between the node C and the node G. Since resistance values of each of the sampling resistors Ra, Rb and Rc are generally large, the resistance values of the sampling resistors Rb and Rc are set as Rb=Rc>1 Mom in order to facilitate analyze. In the automatic locating method of the RSDs of the photovoltaic inverter system, a voltage of the output end of the RSD can be understood as a voltage sampled at the node B or C.

Before the inverter operates, when the RSD is placed in a turned-on state in which the switches K1 and K2 are both turned on, such that the node B is connected to the node G, the sampling resistor Rb is bypassed, and the voltage sampled at the node B is zero. When the RSD is placed in a turned-off state in which the switches K1 and K2 are both turned off, such that the node B is connected to the node G through the sampling resistor Rb, the node C is connected to the node G through the sampling resistor Rc, and the sampling resistors Rb and Rc are not bypassed, the voltages sampled at the nodes B and C, which are not zero, depend on the number of photovoltaic modules and the number of divider resistors connected in the photovoltaic module string.

Figure 4:
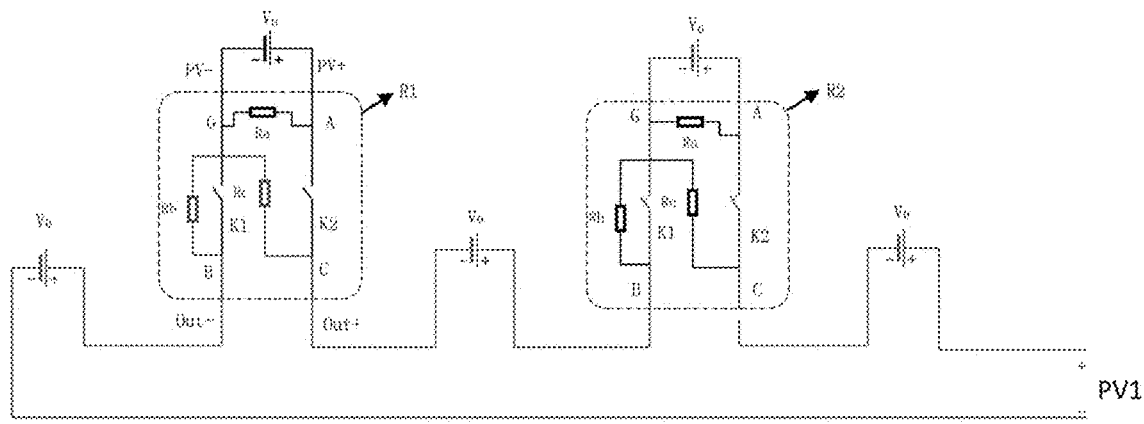
FIG. 4 shows a diagram of a circuit in a state that one RSD is turned off and one RSD is turned on in a same photovoltaic module string of the photovoltaic inverter system of the application.
Figure 5:
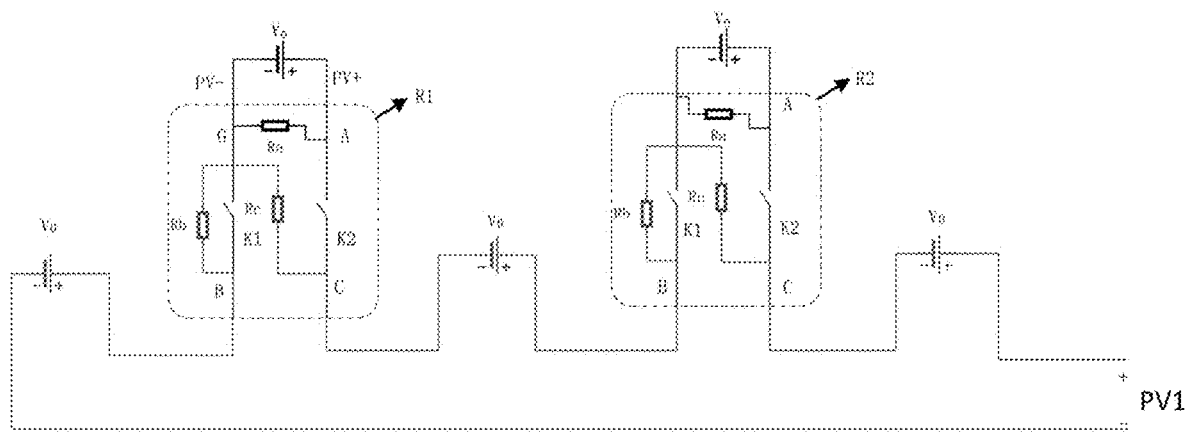
FIG. 5 shows a diagram of a circuit in a state that two RSDs are turned off in a same photovoltaic module string of the photovoltaic inverter system of the application.

FIGS. 4 and 5 illustrate the influence on one RSD (for example, R1) by changing the operating state of other RSD (for example, R2) in the same photovoltaic module string, taking the photovoltaic module string $S_1$ comprising five photovoltaic modules and two RSDs (R1 and R2) as an example. FIG. 4 illustrates a circuit in a state that R1 is turned off and R2 is turned on in a same photovoltaic module string of the photovoltaic inverter system. At this time, the number of photovoltaic modules actually connected to the input end PV1 of the inverter is 4, and the photovoltaic module connected to the input end of R1 is not connected to the input end PV1 because R1 is in the turned-off state.

Accordingly, a total voltage of the photovoltaic module string $S_1$ is 4 Vo, and the number of divider resistors connected to the input end PV1 of the inverter is 2, so the voltage sampled at the node B (or C) of R1 is $U_{B2}$=4 Vo/2=2 Vo. In the automatic locating method of the RSDs of the photovoltaic inverter system, the voltage $U_{B2}$ of the output end of R1 can be defined as a second voltage.

FIG. 5 illustrates that R2 is switched from the turned-on state to the turned-off state. At this time, the number of photovoltaic modules actually connected to the input end PV1 of the inverter is 3, and two photovoltaic modules connected to the input ends of R1 and R2 are not connected to the input end PV1 of the inverter because R1 and R2 are in the turned-off states. Accordingly, a total voltage of the photovoltaic module string $S_1$ is 3 Vo, and the number of divider resistors connected to the input end PV1 of the inverter is 4, so the voltage sampled at the node B (or C) of R1 is $U_{B1}$=3 Vo/4. In the automatic locating method of the RSD of the photovoltaic inverter system, the voltage $U_{B1}$ of the output end of R1 can be defined as a first voltage.

Therefore, after R2 is switched from the turned-on state to the turned-off state, the voltages at the node B of other RSDs (i.e., R1) in the same photovoltaic module string is significantly changed, and such change can distinguish the connection status between the other RSDs and the photovoltaic module string to which R2 belongs. That is, according to such change, it can be determined that which RSDs belong to the photovoltaic module string to which R2 belongs.

Generally, assuming that the photovoltaic module string comprises x photovoltaic modules and y RSDs, and the voltage of each photovoltaic module is Vo, before the inverter operates, all RSDs in the photovoltaic module string are controlled to be in turned-off state, so the voltage sampled at the node B (or C) of any one of RSDs, i.e., the first voltage of the output end of the RSD is:

$$U_{B1}=(x-y)*Vo/2y.$$

Any one of RSDs in the photovoltaic module string is controlled to be turned-on state, and the voltages sampled at the nodes B and C of other RSDs in the same photovoltaic module string are changed. At this time, the number of photovoltaic modules connected to the input end of the inverter is x−y+1, and the number of RSDs in turned-off state in the photovoltaic module string is y−1, so the voltage sampled at the node B (or C) of the RSD in turned-off state, i.e., the second voltage of the output end of the RSD is:

$$U_{B2}=(x-y+1)*Vo/2(y-1).$$

Therefore, after any one of RSDs in the photovoltaic module string is switched from the turned-off state to the turned-on state, a change of the voltage at the node B (or C) of any one of RSDs in the turned-off state in the same photovoltaic module string is:

$$\Delta U_B=U_{B2}-U_{B1}=X*Vo/2y(y-1).$$

Therefore, the corresponding connection relation between the RSD and the photovoltaic module string can be determined based on the change of the voltage at the node B (or C) of the RSD in the turned-off state in the same photovoltaic module string. That is, all RSDs in the photovoltaic module string to which the RSD in turned-on state belongs can be determined according to the first voltage and the second voltage of the output end of each RSD.

In one embodiment of the application, the step S4 may further comprise: calculating a difference value between the second voltage and the first voltage of the output end (node B or C) of each RSD, and comparing the difference value with a first threshold value; and determining that the RSD in the turned-on state and the RSD having the difference value greater than the first threshold value belong to a same photovoltaic module string.

Figure 6:
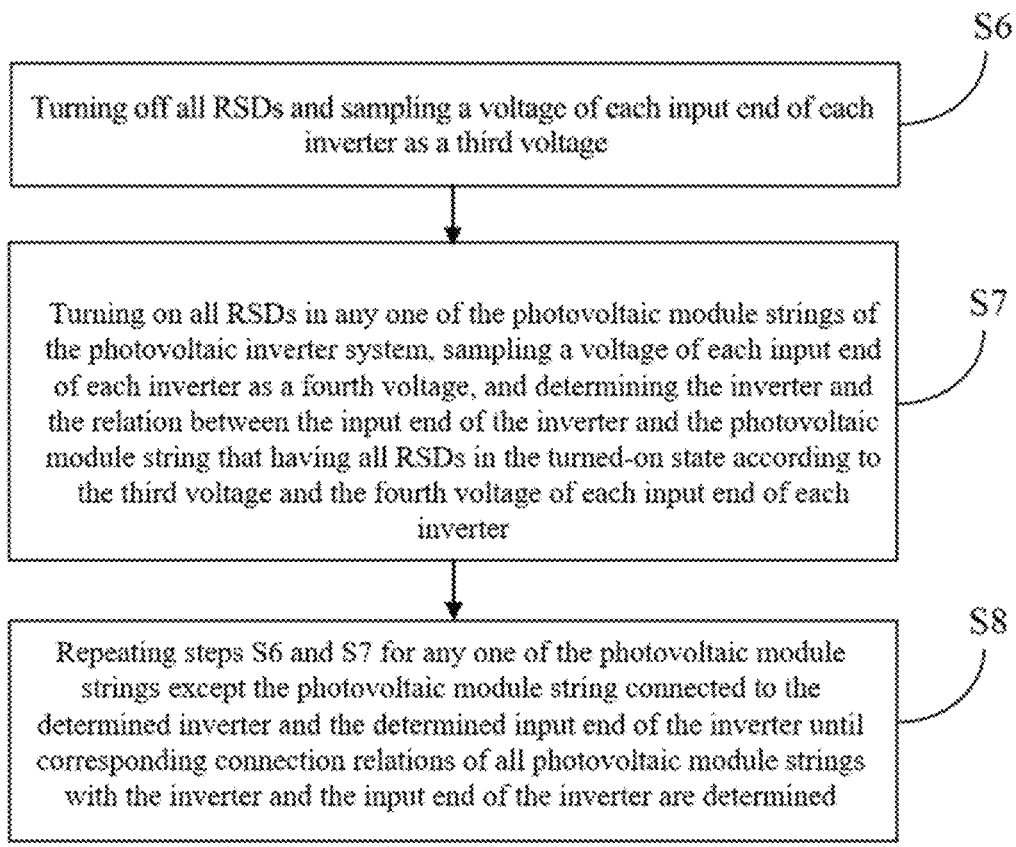
FIG. 6 is a schematic diagram of another automatic locating method of RSD of a photovoltaic inverter system according to the application.

In one embodiment of the application, as shown in FIG. 6, after the corresponding connection relations between all RSDs and all photovoltaic module strings are determined, the automatic locating method may further comprise: step S6 for turning off all RSDs and sampling a voltage of each input end of each inverter as a third voltage; step S7 for turning on all RSDs in any one of the photovoltaic module strings of the photovoltaic inverter system, sampling a voltage of each input end of each inverter as a fourth voltage, and determining the inverter and the relation between the input end of the inverter and the photovoltaic module string having all RSDs in the turned-on state according to the third voltage and the fourth voltage of each input end of each inverter; and step S8 for repeating steps S6 and S7 for any one of the photovoltaic module strings except the photovoltaic module string connected to the determined inverter and the determined input end of the inverter until corresponding connection relations of all photovoltaic module strings with the inverter and the input end of the inverter are determined.

Through the steps S6 to S8, locations of all photovoltaic module strings in the photovoltaic inverter system can be automatically determined. That is, the corresponding connection relation between each of photovoltaic module strings, and the inverter and the input end of the inverter can be determined.

Referring to FIG. 5 again, when R1 and R2 of the photovoltaic module string $S_1$ are turned off before the inverter operates, the number of photovoltaic modules connected to the input end PV1 of the inverter is 3, and the voltage of the input end PV1 of the inverter is zero due to the divider resistors in R1 and R2. That is, the third voltage is zero. When R1 and R2 of the photovoltaic module string $S_1$ are turned on, the number of photovoltaic modules connected to the input end PV1 of the inverter is 5, and the divider resistors in R1 and R2 are bypassed, so the voltage of the input end PV1 of the inverter is 5 Vo. That is, the fourth voltage is 5 Vo. Therefore, when all RSDs in one photovoltaic module string $S_1$ are switched from the turned-off state to the turned-on state, the voltage of the input end of the inverter connected to the photovoltaic module string $S_1$ is changed to 5 Vo. That is, when all RSDs in one photovoltaic module string of the photovoltaic inverter system are switched from the turned-off state to the turned-on state, the voltage of the input end of the inverter connected to the photovoltaic module string is significantly changed, and such change can distinguish the connection status between the photovoltaic module string having all RSDs in the turned-on state, and the inverter and the input end of the inverter. That is, according to such change, it can be determined which inverter and which input end of the inverter is connected to photovoltaic module string having all RSDs in the turned-on state.

In one embodiment of the application, the step S7 may further comprise: calculating a difference value between the fourth voltage and the third voltage of each input end of each inverter, and comparing the difference value with a second threshold value; and determining that the input end of the inverter having the difference value greater than the second threshold value is connected to the photovoltaic module string having all RSDs in the turned-on state.

In one embodiment of the application, the voltage of each input end of each inverter can be a maximum power point tracking (MPPT) voltage.

In one embodiment of the application, the photovoltaic inverter system of the application comprises a main controller electrically connected to the controllers of all inverters. The controller of each inverter may control the RSDs in the photovoltaic module string connected to the input end of the inverter to be turned on or turned off, record the change of the voltages of the output ends of all RSDs before and after switching, determine the corresponding connection relations between the RSDs and the photovoltaic module strings according to the change of the voltages, and provide the above information to the main controller of the photovoltaic inverter system. The main controller of the photovoltaic inverter system may control all RSDs in the photovoltaic module string to be turned on or turned off through the controller of the respective inverter, record the change of the voltage of each input end of each inverter before and after switching, and determine the corresponding connection relations between the photovoltaic module strings, and the inverter and the input ends of the inverter according to the change of the voltage.

The application may further provide a photovoltaic inverter system, which may implement the automatic locating method.

The application may further provide a fault control method for a photovoltaic inverter system, as shown in FIG. 10, comprising: identifying an installing position of each RSD in the photovoltaic inverter system using the automatic locating method as described above, wherein the installing position comprises corresponding connection relations between the RSDs and the photovoltaic module strings, and corresponding connection relations between the photovoltaic module strings, and the inverter and the input ends of the inverter; and when any one of the RSDs has a fault, turning off other RSDs in a same photovoltaic module string to which the RSD having the fault belongs to place these RSDs in a standby state, and placing all of the RSDs outside of the photovoltaic module string to which the RSD having the fault belongs in a normal operating state. It should be understood that the main controller of the photovoltaic inverter system may disconnecting other RSDs in a same photovoltaic module string as the RSD having the fault through the controller of the inverter to place these RSDs in the standby state.

Figure 7:
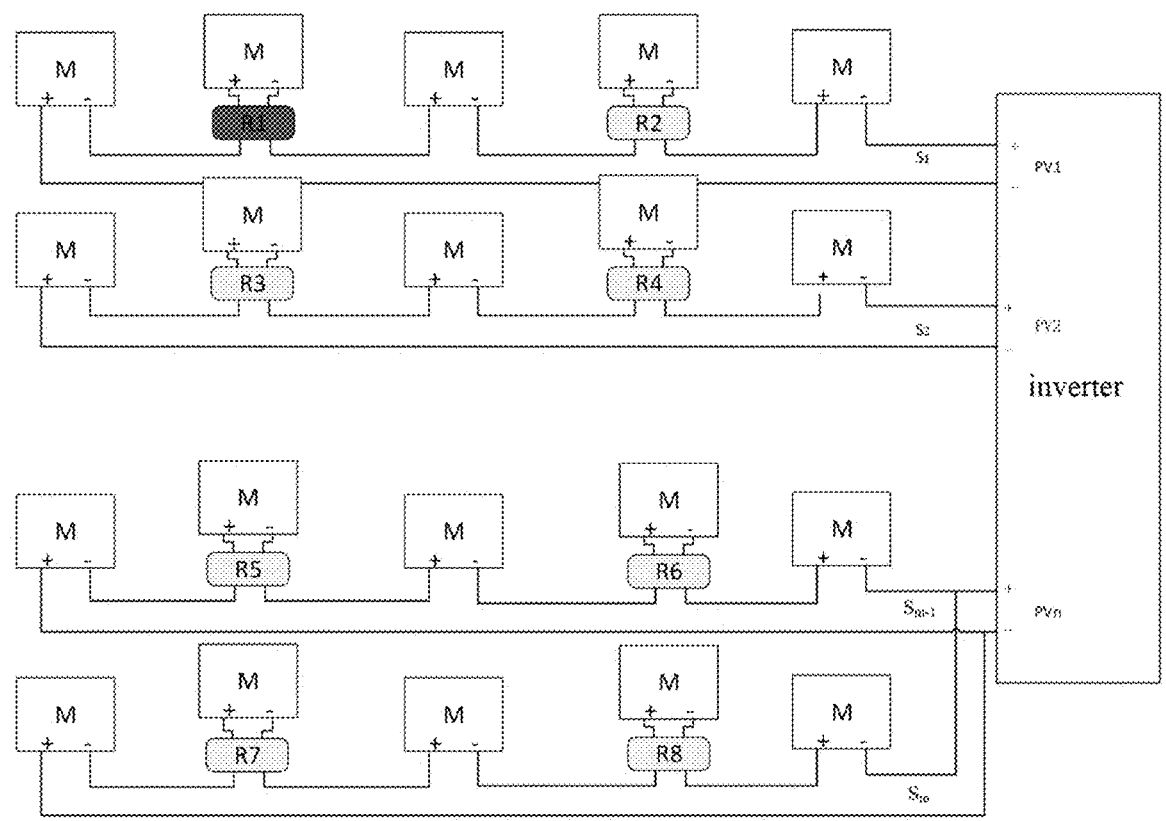
FIG. 7 shows a fault control method for a traditional photovoltaic inverter system when one RSD has a fault.

FIG. 7 shows a fault control method for a traditional photovoltaic inverter system when a RSD has a fault, and particularly illustrates an operating of the inverter when the one RSD has a fault. In FIG. 7, the dark grey RSD is in a fault state, and the light grey RSD is in a standby state. The photovoltaic module string may provide a power to the inverter only when all RSDs in one photovoltaic module string are in a normal operating state. Accordingly, in a case that the installing position of each RSD cannot be identified, if one RSD (e.g., the dark grey R1) has a fault, the inverter may place all other RSDs (e.g., the light grey R2 to R8) in the standby state, such that all input ends PV1 to PVn of the inverter will not provide the power to the inverter, which increases the loss of power generation.

Figure 8:
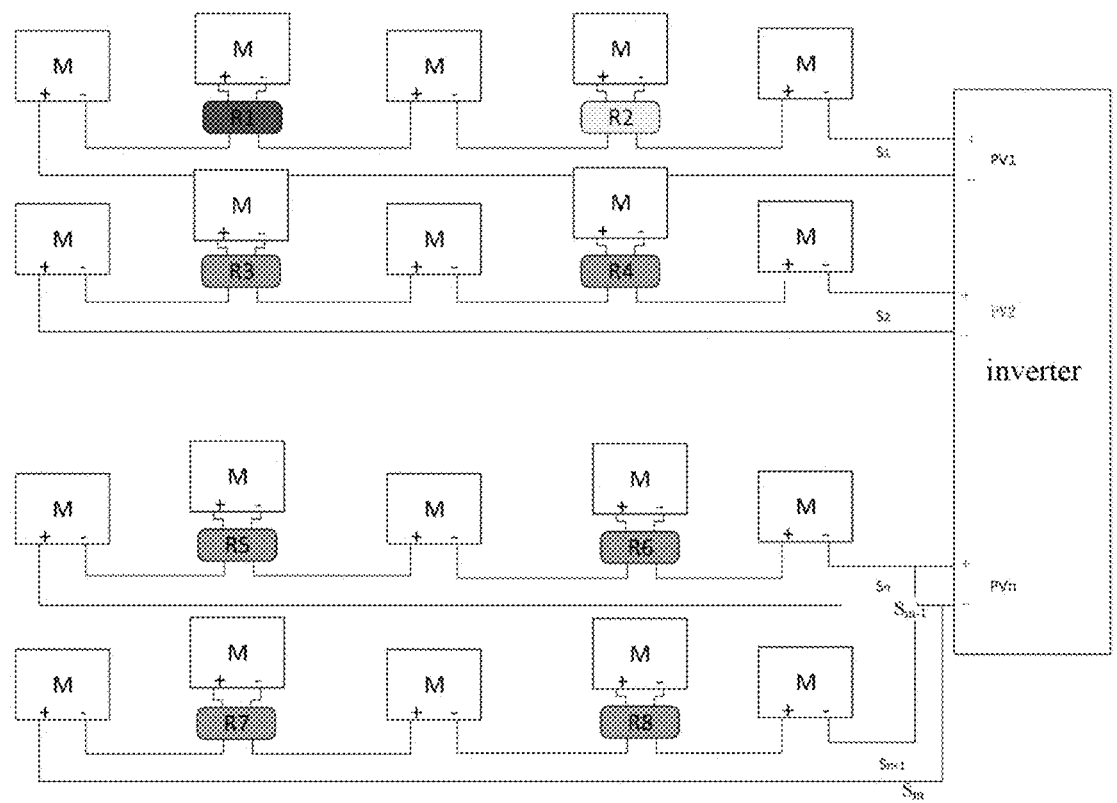
FIG. 8 shows a fault control method for the photovoltaic inverter system in the application when one RSD has a fault.

However, in a case that the installing position of each RSD can be identified, the RSDs in the photovoltaic module string having RSD in fault state may be turned off, and the RSDs in other photovoltaic module strings connected to the input ends of the inverter are placed in a normal operating state, such that other photovoltaic module strings may provide the power to the inverter. As shown in FIG. 8, the dark grey RSD is in a fault state, the medium grey RSD is in a normal operating state, and the light grey RSD is in a standby state. When the controller in the inverter detects a fault of the RSD, such as the dark grey R1 in FIG. 8, the traditional photovoltaic inverter system turns off all RSDs. However, according to the present application, the controller determines that R1 and R2 belong to the same photovoltaic module string $S_1$, and are connected to the input end PV1 of the inverter, and other RSDs (e.g., R3 to R8) are located in different photovoltaic module strings $S_2$ to $S_m$. Therefore, the fault of R1 does not affect R3 to R8, and only the other RSDs (R2) in the photovoltaic module string $S_1$ need to be turned off.

As shown in FIG. 8, when a fault occurs in the dark grey R1, the controller of the inverter may place the light grey R2 in the standby state, and place the medium grey R3 to R8 in the normal operating state. As compared to the method for controlling the fault of the traditional inverter system shown in FIG. 7, the application has significant advantages.

The application can automatically identify the installing position of the rapid shutdown device (RSD) in the photovoltaic inverter system without any additional current sensor, so the cost is reduced and the accuracy and efficiency are improved.

The application can control all the RSDs in any one of the photovoltaic module strings after identifying the installing position of the RSDs, so the controllability is improved.

When the RSD in one photovoltaic module string has a fault, the fault control method of the application will turn off other RSDs in a same photovoltaic module string to which the RSD having the fault belongs, and may not influence the power generation operation of the photovoltaic modules in other photovoltaic module strings, so the robustness and economic effectiveness of the system is improved.

Exemplary embodiments of the application have been shown and described in details. It shall be understood that the application is not limited to the disclosed embodiments. Instead, the application intends to cover various modifications and equivalent settings included in the spirit and scope of the appended claims.

What is claimed is:

1. A method for automatically locating rapid shutdown devices (RSDs) of a photovoltaic inverter system, comprising:

step S1 for providing a plurality of photovoltaic module strings, each comprising at least one photovoltaic module and at least one RSD, input end of the RSD electrically connected to output end of the photovoltaic module, output ends of all RSDs in a same photovoltaic module string connected in series when a number of the RSDs in the same photovoltaic module string is greater than 1;

step S2 for providing at least one inverter, the photovoltaic module string electrically connected to an input end of the inverter;

step S3 for turning off all RSDs and sampling a voltage of the output end of each RSD as a first voltage before the inverter operates;

step S4 for turning on any one of the RSDs of the photovoltaic inverter system and sampling a voltage of the output end of each RSD as a second voltage, and determining all RSDs in the photovoltaic module string to which the RSD in turned-on state belongs according to the first voltage and the second voltage of the output end of each RSD; and step S5 for repeating steps S3 and S4 for any one of the RSDs outside the photovoltaic module string to which the determined RSDs belong until corresponding connection relations between all RSDs and all photovoltaic module strings are determined.

2. The method of claim 1, wherein the step S4 further comprises:
   calculating a difference value between the second voltage and the first voltage of the output end of each RSD, and comparing the difference value with a first threshold value; and
   determining that the RSD in the turned-on state and the RSD having the difference value greater than the first threshold value belong to a same photovoltaic module string.

3. The method of claim 1, after the corresponding connection relations between all RSDs and all photovoltaic module strings are determined, the method further comprises:
   step S6 for turning off all RSDs and sampling a voltage of each input end of each of the at least one inverter as a third voltage;
   step S7 for turning on all RSDs in any one of the photovoltaic module strings of the photovoltaic inverter system, sampling a voltage of each input end of each of the at least one inverter as a fourth voltage, and determining the inverter and the relation between the input end of the inverter and the photovoltaic module string having all RSDs in the turned-on state according to the third voltage and the fourth voltage of each input end of each of the at least one inverter; and
   step S8 for repeating steps S6 and S7 for any one of the photovoltaic module strings except the photovoltaic module string connected to the determined inverter and the determined input end of the inverter until corresponding connection relations of all photovoltaic module strings with the inverter and the input end of the inverter are determined.

4. The method of claim 3, wherein the step S7 further comprises:
   calculating a difference value between the fourth voltage and the third voltage of each input end of each of the at least one inverter, and comparing the difference value with a second threshold value; and
   determining that the input end of the inverter having the difference value greater than the second threshold value is connected to the photovoltaic module string having all RSDs in the turned-on state.

5. A fault control method for a photovoltaic inverter system, comprising:
   identifying an installing position of each RSD in the photovoltaic inverter system using the method of claim 3, wherein the installing position comprises corresponding connection relations between the RSDs and the photovoltaic module strings, and corresponding connection relations between the photovoltaic module strings, and the inverter and the input ends of the inverter; and
   when any one of the RSDs has a fault, turning off other RSDs in a same photovoltaic module string to which the RSD having the fault belongs to place these RSDs in a standby state, and placing all of the RSDs outside of the photovoltaic module string to which the RSD having the fault belongs in a normal operating state.

6. The method of claim 1, wherein each of the at least one inverter comprises a controller communicated with the inverter and the RSDs in the photovoltaic module string connected to the input end of the inverter for controlling operating state of the inverter and the RSDs in the photovoltaic module string.

7. The method of claim 1, wherein each of the RSDs comprises a plurality of resistors and a plurality of switches.

8. The method of claim 1, wherein at least two photovoltaic module strings are connected in parallel to a same input end of the inverter.

9. The method of claim 1, wherein each of the photovoltaic module strings is respectively connected to one input end of the inverter.

10. The method of claim 1, wherein the input end of each RSD is respectively connected to one output end of the photovoltaic module in the same photovoltaic module string.

11. The method of claim 1, wherein a number of photovoltaic modules in the photovoltaic module string is greater than the number of RSDs in the photovoltaic module string, and output ends of the photovoltaic modules not connected to the input ends of the RSDs are connected in series with the output ends of all RSDs.

12. The method of claim 1, wherein the input end of the inverter has a function of maximum power point tracking (MPPT).

13. A photovoltaic inverter system configured to implement the method of claim 1.

* * * * *